United States Patent
Morrison et al.

(10) Patent No.: US 9,719,782 B2
(45) Date of Patent: Aug. 1, 2017

(54) METHOD OF DETECTING ATTITUDE FAULTS BASED ON MAGNETOMETER MEASUREMENTS

(71) Applicant: Honeywell International Inc., Morristown, NJ (US)

(72) Inventors: John R. Morrison, Minneapolis, MN (US); Douglas Mark Weed, Forest Lake, MN (US); Mark Hickey, New Hope, MN (US)

(73) Assignee: Honeywell International Inc., Morris Plains, NJ (US)

( * ) Notice: Subject to any disclaimer, the term of this patent is extended or adjusted under 35 U.S.C. 154(b) by 43 days.

(21) Appl. No.: 14/599,027

(22) Filed: Jan. 16, 2015

(65) Prior Publication Data

US 2016/0109233 A1    Apr. 21, 2016

Related U.S. Application Data (60) Provisional application No. 62/066,133, filed on Oct. 20, 2014.

(51) Int. Cl.
*G01C 9/00* (2006.01)
*B64D 45/00* (2006.01)
(Continued)

(52) U.S. Cl.
CPC ............. *G01C 9/005* (2013.01); *B64D 43/00* (2013.01); *B64D 45/00* (2013.01); *G01C 17/38* (2013.01);
(Continued)

(58) Field of Classification Search
None
See application file for complete search history.

(56) References Cited

U.S. PATENT DOCUMENTS 5,841,537 A    11/1998    Doty
7,587,277 B1 *  9/2009    Wells ................... G01C 21/165
                                                    701/510
(Continued)

FOREIGN PATENT DOCUMENTS

CN    103630137    3/2014
JP    2010266214    11/2010

OTHER PUBLICATIONS

European Patent Office, "Extended European Search Report from EP Application No. 15189445.8 mailed Feb. 22, 2016", "from Foreign Counterpart of U.S. Appl. No. 14/599,027", Feb. 22, 2016, pp. 1-8, Published in: EP.

(Continued)

*Primary Examiner* — Truc M Do
(74) *Attorney, Agent, or Firm* — Fogg & Powers LLC (57) ABSTRACT

An avionics system comprises one or more attitude sources, each configured to produce a respective calculated attitude solution; at least one magnetometer configured to measure magnetic field; and at least one attitude monitor configured to use the respective calculated attitude solution from one of the attitude sources to project the measured magnetic field estimate or an Earth Magnetic Field Model (EMFM) estimate such that the measured magnetic field estimate and the EMFM estimate are in a common shared frame. The at least one attitude monitor is further configured to determine a difference between the measured magnetic field estimate and the EMFM estimate in the common shared frame. The at least one attitude monitor is further configured to output an alert, which indicates that the respective calculated attitude solution used to project the measured magnetic field estimate or the EMFM estimate is in error, if the difference exceeds a predetermined threshold.

20 Claims, 5 Drawing Sheets

(51) Int. Cl.
*G01S 19/40* (2010.01)
*B64D 43/00* (2006.01)
*G01C 17/38* (2006.01)
*G01C 21/08* (2006.01)
*G01C 21/16* (2006.01)

(52) U.S. Cl.
CPC ........... *G01C 21/08* (2013.01); *G01C 21/165* (2013.01); *G01S 19/40* (2013.01)

(56) References Cited

U.S. PATENT DOCUMENTS

| | | | | |
|---|---|---|---|---|
| 8,204,635 B2 * | 6/2012 | Manfred | ............... | G01C 23/00 340/945 |
| 8,275,544 B1 * | 9/2012 | Wells | ................... | G01C 21/165 342/146 |
| 8,442,703 B2 * | 5/2013 | Petillon | .................. | G01C 21/16 342/357.3 |
| 9,207,079 B2 * | 12/2015 | Askarpour | ............ | G01C 17/38 |
| 9,228,842 B2 * | 1/2016 | Joseph | ................... | G01C 17/38 |
| 2002/0008661 A1 * | 1/2002 | McCall | ................ | G01C 21/165 342/357.3 |
| 2004/0123474 A1 * | 7/2004 | Manfred | ............... | G01C 17/38 33/352 |
| 2005/0040985 A1 * | 2/2005 | Hudson | ............... | G01C 21/165 342/357.31 |
| 2005/0188556 A1 * | 9/2005 | Lee | ....................... | G01C 17/38 33/356 |
| 2014/0139432 A1 * | 5/2014 | Shaw | ................... | G06F 3/0346 345/158 |

OTHER PUBLICATIONS

Bogh et al., "Autonomous Attitude Control System for the Orsted Satellite", 1996, pp. 1-10, Publisher: IEEE.
Svein Tohami El Moussaoiii Brembo, "Sensor Modeling, Attitude Determination and Control for Micro-Satellite", , pp. i-80, Publisher: Norwegian University of Science and Technology.
Irawan et al., "Attitude Monitoring and Surveillance System for Lapan Payload Test Rocket", "2013 3rd International Conference on Instrumentation Control and Automation (ICA)", Aug. 28-30, 2013, pp. 155-160, Published in: Bali, Indonesia.
Lundberg et al., "Synthetic Attitude and Heading Reference for Saab Gripen", "Proceedings of the 39th IEEE—Conference on Decision and Control", Dec. 2000, p. 2040-2043, Publisher: IEEE, Published in: Sydney, Australia.
Moreira et al., "Attitude Estimation Using MEMS IMU and Magnetometer Data with PI Filter", "22nd International Congress of Mechanical Engineering", Nov. 3-7, 2013, pp. 4234-4242, Published in: Brazil.
European Patent Office, "EP Office Action from EP Application No. 15189445.8 mailed Apr. 19, 2017", "from Foreign Counterpart of U.S. Appl. No. 14/599,027", Apr. 19, 2017, pp. 17, Published in: EP.

* cited by examiner

METHOD OF DETECTING ATTITUDE FAULTS BASED ON MAGNETOMETER MEASUREMENTS

CROSS-REFERENCE TO RELATED APPLICATION

This application claims the benefit of U.S. Provisional Patent Application Ser. No. 62/066,133, filed on Oct. 20, 2014, which is hereby incorporated herein by reference

BACKGROUND

For aircraft safety reasons, there is a need to detect attitude faults. One typical approach to detecting attitude faults is to have redundant attitude systems combined with some sort of comparison method. When the redundancy is down to only two attitude systems and they disagree, it can be difficult to decide which one is in error. In this case, and in other cases in general, a system that can detect attitude faults is needed. A system that is capable of detecting attitude faults is referred to as an attitude monitor.

SUMMARY

In one embodiment an avionics system is provided. The avionics system comprises one or more attitude sources, each configured to produce a respective calculated attitude solution; at least one magnetometer configured to measure magnetic field in a frame of the avionics system; and at least one attitude monitor configured to use the respective calculated attitude solution from at least one of the one or more attitude sources to project at least one of the measured magnetic field estimate or an Earth Magnetic Field Model estimate such that the measured magnetic field estimate and the Earth Magnetic Field Model estimate are in a common shared frame. The at least one attitude monitor is further configured to determine a respective difference between the measured magnetic field estimate and the Earth Magnetic Field Model estimate in the common shared frame. The at least one attitude monitor is further configured to output an alert, which indicates that the respective calculated attitude solution used to project at least one of the measured magnetic field estimate or the Earth Magnetic Field Model estimate is in error, if the respective difference between the measured magnetic field estimate and the Earth Magnetic Field Model estimate exceeds a predetermined threshold.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific exemplary embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein enable the use of a magnetometer to detect attitude faults as distinguished from using the magnetometer to measure attitude. That is, the magnetometer is used to detect if an attitude that has already been determined by the system being monitored is in error. Additionally, some aircraft architectures already include a magnetometer for the purpose of determining magnetic heading. In such situations, the magnetometer can be configured for detecting attitude faults without additional hardware.

Figure 1:
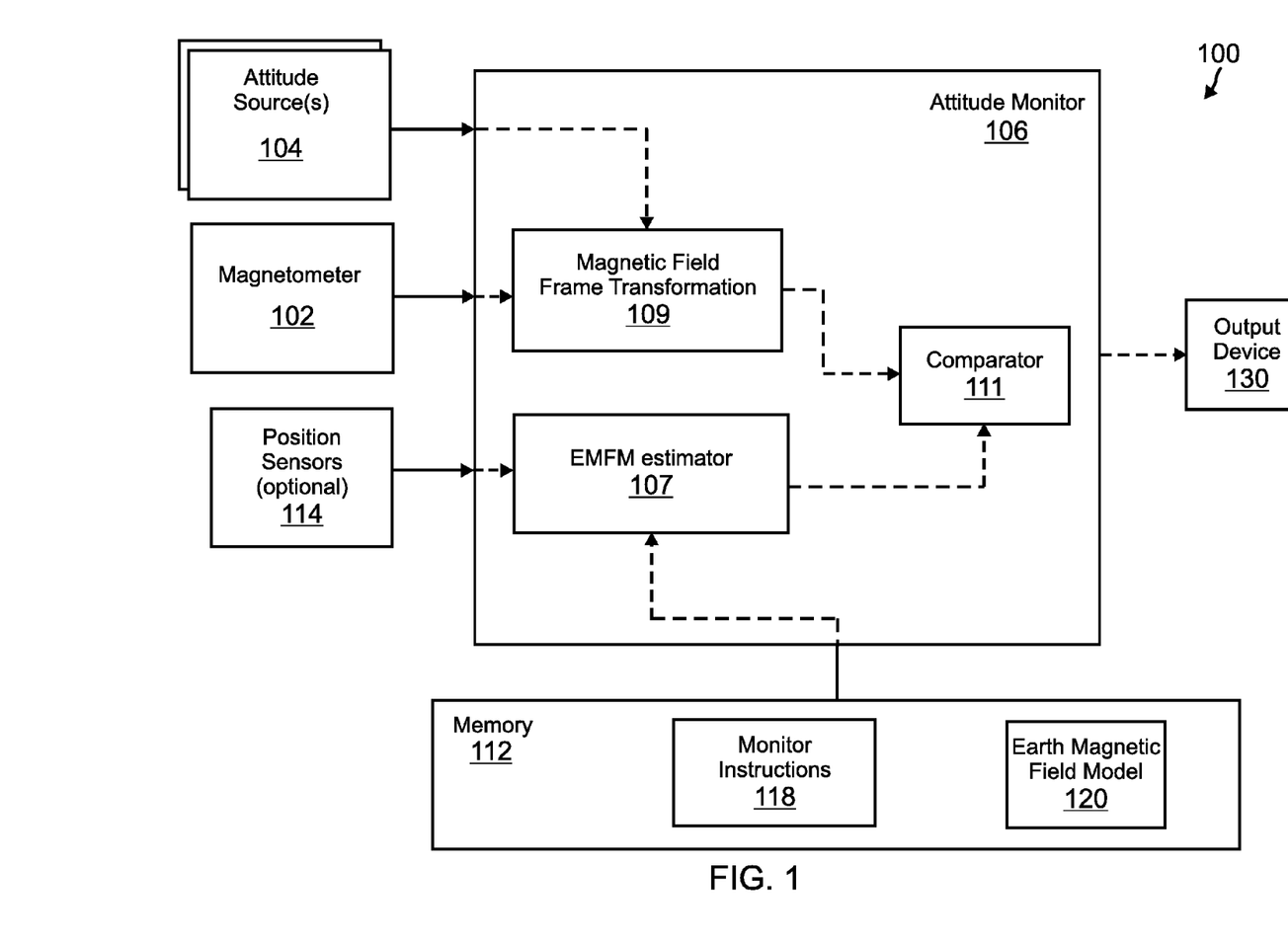
FIG. 1 is a block diagram of one embodiment of an exemplary system for monitoring attitude errors.

FIG. 1 is a block diagram of one embodiment of a system 100 for monitoring attitude errors. System 100 includes a magnetometer 102, one or more attitude sources 104, and an attitude monitor 106. The one or more attitude sources 104 can be implemented using systems known to one of skill in the art, such as, but not limited to, an Air Data Inertial Reference Unit (ADIRU), an Inertial Reference Unit (IRU), or an Attitude Heading Reference Unit (AHRU). Each attitude source 104 includes components for calculating attitude such as, but not limited to, one or more rate gyroscopes and one or more accelerometers. Rate gyroscopes are configured to measure angular velocity about a respective axis. Additionally, in some embodiments, the magnetometer 102 is included as a component of the attitude source 104. However, for purposes of explanation, the magnetometer 102 is depicted and explained separate from the attitude source 104.

In this example, the magnetometer 102 is a three-axis magnetometer. The three-axis magnetometer 102 measures the strength of the local magnetic field along three independent axes. In some embodiments, the three independent axes are orthogonal. In other embodiments, the three independent axes are not orthogonal, but are still independent of one another. The system 100 also includes one or more position sensors 114, such as, but not limited to, Global Navigation Satellite System (GNSS) receivers or Inertial Reference Systems (IRS). Position sensors 114 provide additional measurements used to determine location of the aircraft (i.e. latitude, longitude, and altitude). Suitable position sensors are known to one of skill in the art and are not described in more detail herein.

The attitude monitor 106 can be implemented using a central processing unit (CPU), microcontroller, microprocessor (e.g., a digital signal processor (DSP)), field programmable gate array (FPGA), application specific integrated circuit (ASIC), and other processing devices. The memory device 112 can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

For example, in this embodiment, the monitor 106 is implemented as a central processing unit which includes or functions with software programs, firmware or other computer readable instructions stored on memory device 112 for carrying out various methods, process tasks, calculations, and control functions, used for the magnetometer calibration and compensation. For example, stored on memory device 112 in this embodiment are monitor instructions 118 that, when executed by the processing unit, cause the processing unit to perform one or more of the techniques described herein to monitor an attitude source. In addition, in this example, an Earth Magnetic Field Model (EMFM) 120 is stored on the memory device 112. One non-limiting example of such a model of the Earth's magnetic field, known as the International Geomagnetic Reference Field (IGRF), is made publicly available by the International Association of Geomagnetism and Aeronomy (IAGA). Another non-limiting example of such a model is the World Magnetic Model (WMM) made publicly available by the National Oceanic and Atmospheric Administration (NOAA). Although the monitor instructions 118 and the EMFM 120 are stored on the same memory device 112, in this example, it is to be understood that separate memory devices can be used in other embodiments.

In operation, the attitude monitor 106 receives position measurements from the position sensor 114, an estimated attitude solution from the attitude source 104, and a measured magnetic field estimate from the magnetometer 102. Based on the position estimate from the position sensor 114, the attitude monitor 106 calculates an Earth Magnetic Field Model estimate (e.g. in the EMFM estimator 107). In particular, the attitude monitor 106 uses the latitude, longitude, altitude, and time estimates as inputs to the Earth Magnetic Field Model 120 for computing an estimated magnetic field value based on the Earth Magnetic Field Model. The Earth Magnetic Field Model is in a reference frame, such as the North, East, Down (NED) frame or the North-Oriented Local Level (NOLL) frame. In contrast, the measured magnetic field estimate from the magnetometer 102 is in the body frame of the vehicle.

The attitude monitor 106 is configured to project or transform at least one of the measured magnetic field estimate or the EMFM estimate into a common shared frame (e.g. in the magnetic field frame transformation 109). A common shared frame means that both the EMFM estimate and the measured magnetic field estimate share or are in the same frame. For example, in this embodiment, the attitude monitor 106 is configured to project the measured magnetic field estimate into the reference frame of the EMFM estimate based on the attitude solution provided by the attitude source 104. Alternatively, in other embodiments, the attitude monitor 106 is configured to project the Earth Magnetic Field Model estimate into the body frame based on the attitude solution provided by the attitude source 104. In other embodiments, the attitude monitor 106 transforms each of the EMFM estimate and the measured magnetic field estimate to the same frame which is neither the reference frame of the EMFM estimate nor the body frame.

Additionally, in some embodiments, the position sensor 114 is not included and the Earth Magnetic Field Model estimate is computed based on position estimates from the attitude source 104. After projecting the measured magnetic field estimate into the reference frame of the EMFM estimate, the attitude monitor 106 compares the measured magnetic field estimate to the EMFM estimate (e.g. in the comparator 111). If a difference between the measured magnetic field estimate and the EMFM estimate exceeds a threshold value, the attitude monitor 106 outputs a warning to an output device 130 as the difference is due to an error in the attitude solution used to project the measured magnetic field estimate. For example, in some embodiments, the output device is a display unit. In other embodiments, the warning can be output to an audio device, directly to the flight controls, or other downstream unit which utilizes the attitude solution.

If the difference does not exceed a threshold, the attitude monitor 106 can repeat the process when new data is received and/or when another calculated attitude solution is received by the attitude monitor 106. For example, the threshold can be set to detect attitude errors in excess of ±5 degrees of pitch and AO degrees of roll. It is to be understood that these values are provided by way of example only and are not to be considered limiting.

Figure 2:
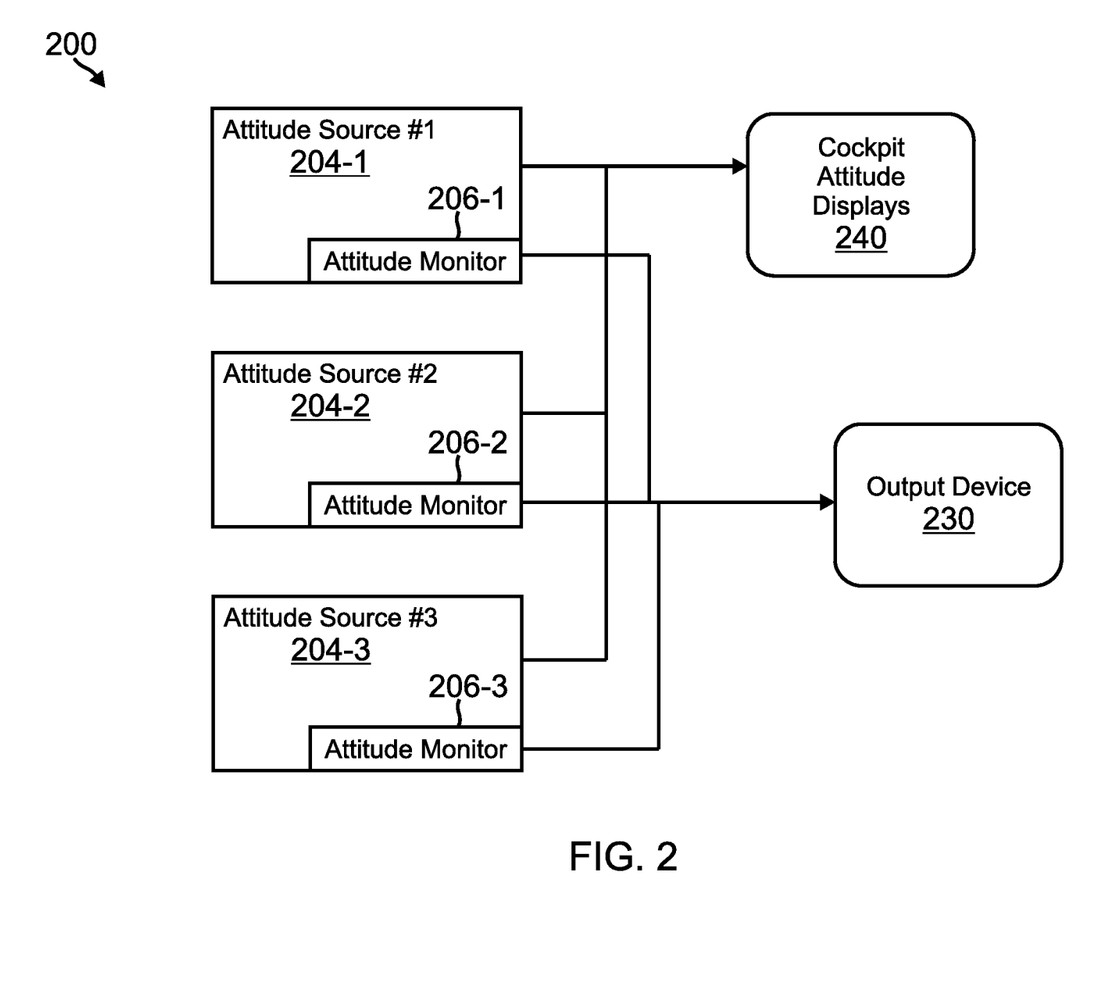
FIG. 2 is a block diagram of another embodiment of an exemplary system for monitoring attitude errors.

As mentioned above, the monitor 106 can be implemented through executable instructions configured to cause at least one programmable processor to perform the actions described herein. Thus, respective attitude monitors 206 can be implemented within each of a plurality of attitude sources 204, as shown for example in FIG. 2. While three attitude sources 204-1 . . . 204-3 are shown in FIG. 2, in alternate embodiments, system 200 may comprise more than, or less than, 3 attitude sources. Each of the three attitude sources 204 outputs data to one or more cockpit attitude displays 240 that provide aircraft attitude measurement information to a flight crew.

In some instances, one or more of the attitude sources 204 can stop working properly. In these instances, conventional navigation systems often cannot determine if one of the remaining in-service attitude sources 204 fails to work properly. In the embodiments described herein, the respective attitude monitors 206 are used for that purpose. In particular, each of the attitude sources 204 has an associated attitude monitor 206 that identifies when attitude data from its respective attitude source 204 is suspect or failed, using the techniques discussed herein. The respective attitude monitor 206 generates an alarm which is output to an output device 230, such as an instrument status display for example, when it is determined that the error in the attitude data exceeds a predetermined threshold. In other embodiment, other output devices can be used, as discussed above. For example, in some embodiments, the alarm or warning is output to the cockpit attitude display 240.

Figure 3:
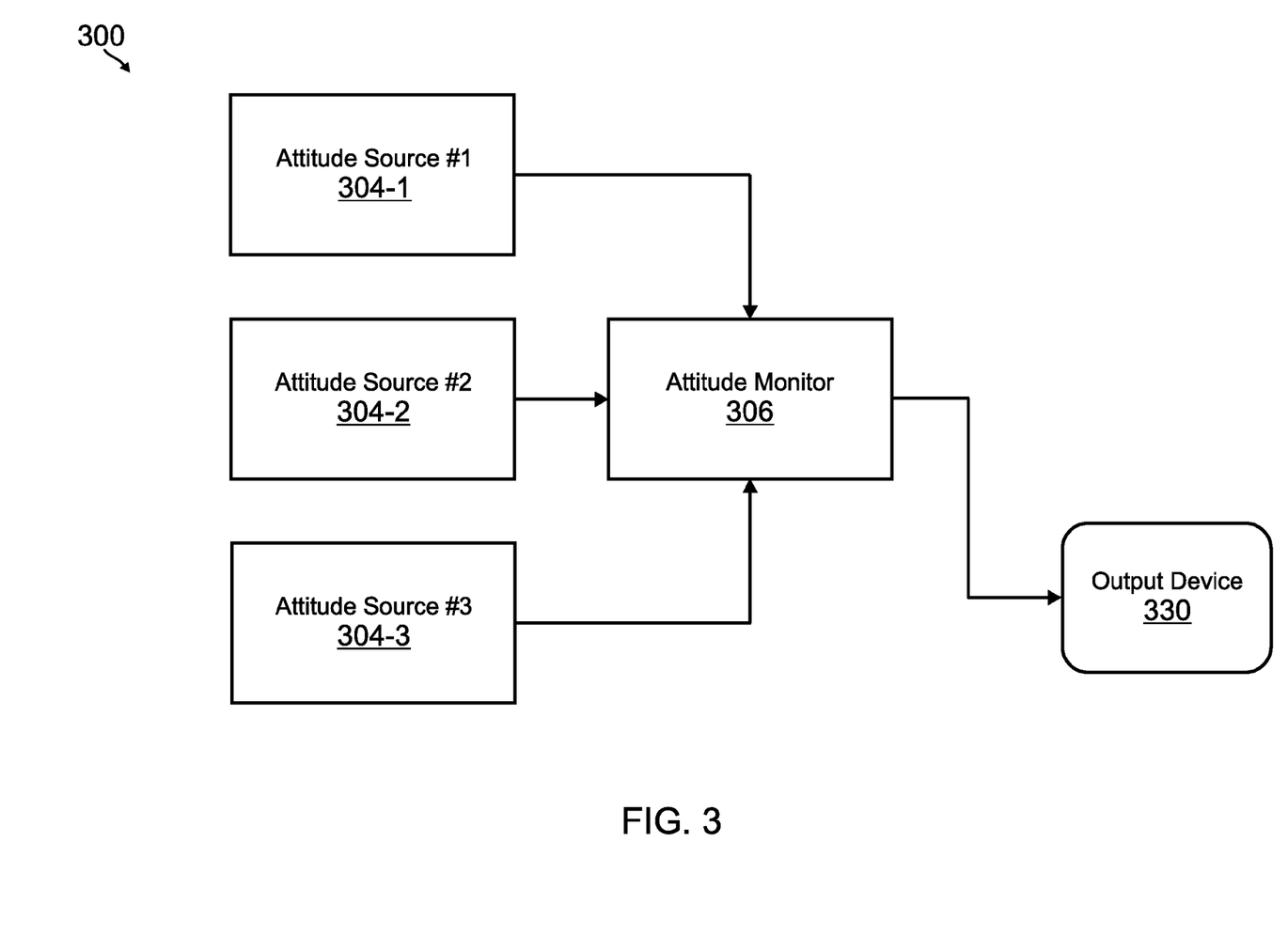
FIG. 3 is a block diagram of another embodiment of an exemplary system for monitoring attitude errors.

Although the attitude monitors 206 are integral to the attitude sources 204 in the example shown in FIG. 2, in other embodiments, the monitors are implemented externally from the attitude sources. For example, the attitude monitors can be implemented within the avionics equipment associated with the cockpit attitude displays 240, the output device 230, or with other avionics equipment. Additionally, although separate monitors 206 are associated with each attitude source 204 in the example of FIG. 2, in other embodiments only a single monitor is used for all of the attitude sources. For example, in FIG. 3, a single attitude monitor 306 is implemented external to the attitude sources 304.

In addition to determining if an attitude solution exceeds a predetermined threshold, each attitude monitor 206 can be used to determine if the sensitivity level of the respective attitude monitor 206 exceeds the predetermined threshold.

In other words, if the sensitivity level of the attitude monitor 206 is not greater than the threshold, then it cannot be determined if the attitude monitor results are valid. For example, for an AHRU, an attitude error monitor threshold can be set consistent with the normal expected attitude errors which can be 2° of pitch and roll error, for example. Furthermore, if the attitude error monitor 206 is being used to assure a pitch safety limit of 5°, then the attitude error sensitivity for a 5° error must be better than the 2° threshold for the attitude monitor 206 to produce a usable result.

Figure 4:
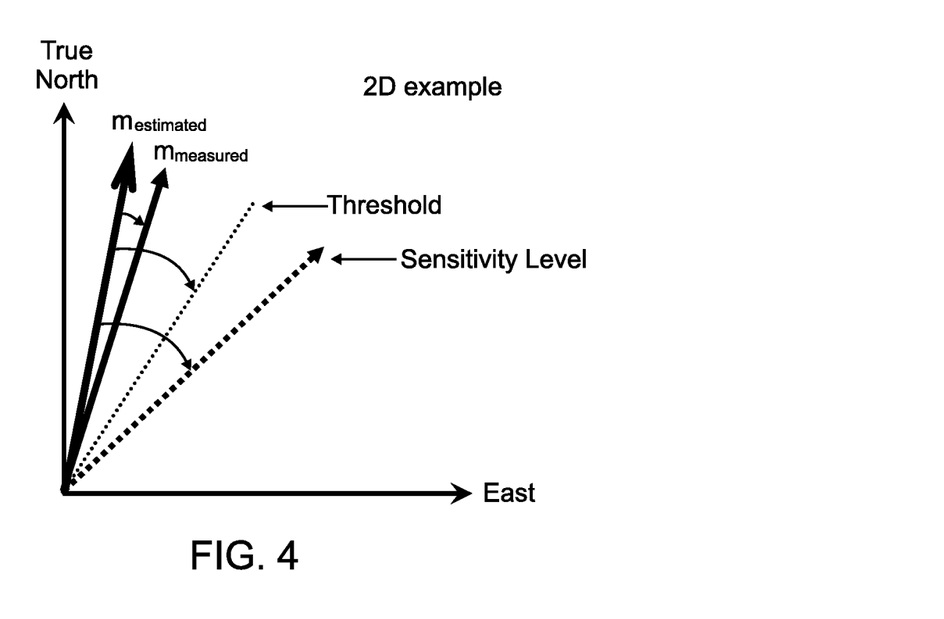
FIG. 4 shows an example comparison of magnetic field vectors for use in attitude error monitoring

FIG. 4 shows an example comparison of magnetic field vectors for use in attitude error monitoring, as discussed above. Note that while this example is shown in 2-dimensions, the actual monitoring can be done in all 3-dimensions which include roll, pitch, and heading attitudes along with all components of the magnetic field vectors. The example of FIG. 4 is showing the case where an attitude source such as an IRS or AHRU is within the threshold indicating that an excessive attitude error does not exist. This is indicated in FIG. 4 by the vector $m_{measured}$ located between the axis representing true north and the threshold vector. The monitor sensitivity level is greater than the threshold indicating that attitude errors are sufficiently observable such that the monitor results are valid. This is depicted in FIG. 4 by threshold vector being located between the axis representing true north and the sensitivity level vector. It is to be understood that the attitude monitoring method described below validates a single attitude source and may be applied independently to multiple attitude sources. The exemplary vectors in FIG. 4 are defined as follows:

- $m_{estimated}$=estimated magnetic field vector given by a Earth Magnetic Field Model (EMFM) for the current location and time (also referred to herein as $m_{truth}$)
- $m_{measured}$=measured magnetic field vector projected into a reference frame, such as the NED (North, East, Down) frame, using the attitude source that is being monitored.

In general, the attitude error monitoring involves computing the vector dot product between two magnetic vectors and determining if the result exceeds a threshold. In addition, the monitor indicates if the results are valid or invalid. It is assumed that the instrument used to measure the magnetic field is not faulted and remains within its expected error level. In some embodiments, the attitude fault logic for a single attitude source is as follows:

- If the sensitivity level is inside or less than the threshold, then the monitor results are invalid.
- If the sensitivity level is outside or greater than the threshold, then the monitor results are valid.
- If the monitor results are valid and ($m_{measured} \cdot m_{truth}$) is outside or greater than the threshold, then the attitude source is faulted.
- Else the attitude source is not faulted.

Additionally, in some embodiments, the attitude fault logic for multiple attitude sources is as follows:

- If the sensitivity level for a given attitude source is inside the threshold, then the monitor results for that attitude source are invalid.
- If the sensitivity level for the given attitude source is outside the threshold, then the monitor results for that attitude source are valid.
- If the monitor results are valid for the given attitude source and ($m_{measured} \cdot m_{truth}$ for the given attitude source is outside the threshold and ($m_{measured} \cdot m_{truth}$) for the given attitude source is worse than all other attitude sources with valid monitor results (e.g. the ($m_{measured} \cdot m_{truth}$) for the given attitude source exceeds the threshold more than ($m_{measured} \cdot m_{truth}$ for the other valid attitude sources), then the given attitude source is faulted.
- Else the attitude source is not faulted Furthermore, with respect to the following mathematical expressions, the following definitions are used:

- $m_{truth}^{NED}$="truth" magnetic field vector in the NED frame from EMFM
- $m_{truth}^{B}$="truth" magnetic field vector in the Body frame from EMFM
- $m_{measured}^{B}$=magnetic field vector in the aircraft Body frame from magnetometer
- $C_{NED}^{B}$=Transformation Direction Cosine Matrix (DCM) from NED to Body frame using truth attitude
- $\tilde{C}_{NED}^{B}$=Transformation DCM from NED to Body frame using the attitude source
- $\delta C_{NED}^{NED}$=Transformation Error in the NED frame when using the attitude source From the above definitions, it is understood that $C_{NED}^{B} = \tilde{C}_{NED}^{B} \delta C_{NED}^{NED}$. The transformation DCMs are generated from the roll, pitch, and true heading angles ($\phi, \theta, \psi$) as follows:

$$C_{NED}^{B} = (C(\phi)C(\theta)(\psi)) = \left( \begin{bmatrix} 1.0 & 0.0 & 0.0 \\ 0.0 & \cos(\phi) & \sin(\phi) \\ 0.0 & -\sin(\phi) & \cos(\phi) \end{bmatrix} \begin{bmatrix} \cos(\theta) & 0.0 & -\sin(\theta) \\ 0.0 & 1.0 & 0.0 \\ \sin(\theta) & 0.0 & \cos(\theta) \end{bmatrix} \right.$$

$$\left. \begin{bmatrix} \cos(\psi) & 0.0 & \sin(\psi) \\ -\sin(\psi) & \cos(\psi) & 0.0 \\ 0.0 & 0.0 & 1.0 \end{bmatrix} \right)$$

The quality factor for the attitude source being monitored can be expressed as follows:

$$Q = \frac{\left( (\tilde{C}_{NED}^{B})^{-1} m_{measured}^{B} \right) \cdot m_{truth}^{NED}}{\|m_{measured}^{B}\| \|m_{truth}^{NED}\|}$$

The quality factor is equivalent to the cosine of the angle ($\gamma$) between the measured magnetic field vector and the truth magnetic field vector, since the dot product of two vectors is $V1 \cdot V2 = \|V1\| \|V2\| \cos \gamma$. Therefore, the quality factor will vary between 0.0 and 1.0, where a value of 1.0 represents perfect data with no attitude errors, no magnetic measurement errors, and no truth model errors.

It is desirable to determine the sensitivity of the quality factor to the various error sources in this problem (attitude errors, magnetic measurement error, and truth magnetic model error) so that it can be determined that the attitude errors are observable above the magnetic measurement errors and also to use the sensitivity to set decision limits and thresholds. The truth magnetic model errors can be assumed to be zero, in some embodiments, with the expectation that the truth magnetic model will be sufficiently implemented in the Attitude Error Monitor so that the truth magnetic model errors are better than ⅒ of the magnetic measurement errors. Therefore, the sensitivity of the quality factor can be approximated to the first order as a function of attitude error and magnetic measurement error as follows:

$$\delta Q = \left( \frac{\delta Q}{\delta C} \right) \delta C + \left( \frac{\delta Q}{\delta m_{measured}} \right) \delta m_{measured}$$

-continued $$\delta Q = \frac{((C_{NED}^B \delta C_{NED}^{NED})^{-1} m_{truth}^B) \cdot m_{truth}^{NED}}{\|m_{truth}^B\| \|m_{truth}^{NED}\|} + \frac{((C_{NED}^B)^{-1}(m_{truth}^B + \delta m_{measured}^B)) \cdot m_{truth}^{NED}}{\|m_{truth}^B + \delta m_{measured}^B\| \|m_{truth}^{NED}\|}$$

attitude error sensitivity + magnetic measurement error sensitivity

Thus, δQ can be used to set a threshold in the Attitude Error Monitor real time implementation in order to determine if an attitude source is exceeding some level of interest such as the normal expected error level. Additionally, the attitude error monitor results are only used, in some embodiments, when the attitude error sensitivity is better than some minimum level, such as when the attitude sensitivity to a safety limit is better than the threshold.

The above sensitivity equation can be simplified for implementation into a real time system where the truth attitude $C_{NED}^B$ and truth magnetic measurements in the body frame $m_{truth}^B$ will not be available. For the numerator of the first term, the matrix inverses can be rearranged allowing $m_{truth}^B$ to become $m_{truth}^{NED}$ as shown below:

$$((C_{NED}^B \delta C_{NED}^{NED})^{-1} m_{truth}^B) \text{ to } ((\delta C_{NED}^{NED})^{-1}(C_{NED}^B)^{-1} m_{truth}^B) \text{ and then to } ((\delta C_{NED}^{NED})^{-1} m_{truth}^{NED})$$

For the denominator of the first term, the magnitude of a vector is the same regardless of the coordinate frame, i.e. $\|m_{truth}^B\| = \|m_{truth}^{NED}\|$. In the second term, it is desirable to know the worst case vector addition of the true magnetic field vector with magnetic measurement errors, ($m_{truth}^B + \delta m_{measured}^B$). This worst case occurs, for example, when the two vectors are perpendicular to one another, and during this condition the angle between the truth magnetic field vector and the erroneously measured field vector is determined by $$\gamma = \tan^{-1}\left(\frac{\|\delta m_{measured}^B\|}{\|m_{truth}^B\|}\right) = \tan^{-1}\left(\frac{\|\delta m_{measured}^B\|}{\|m_{truth}^{NED}\|}\right)$$

Therefore, the entire second term can be replaced by cos $$\left(\tan^{-1}\left(\frac{\|\delta m_{measured}^B\|}{\|m_{truth}^{NED}\|}\right)\right),$$

which represents the cosine of the angle between the truth magnetic field vector and the erroneously measured field vector due only to magnetic measurement errors. Therefore the equation for δQ simplifies to the following which is now expressed in terms that are easily computed from data available to the Attitude Error Monitor:

$$\delta Q = \frac{((\delta C_{NED}^{NED1})^{-1} m_{truth}^{NED}) \cdot m_{truth}^{NED}}{\|m_{truth}^{NED}\| \|m_{truth}^{NED}\|} + \cos\left(\tan^{-1}\left(\frac{\|\delta m_{measured}^B\|}{\|m_{truth}^{NED}\|}\right)\right)$$

attitude error sensitivity + magnetic measurement error sensitivity

Thus, as discussed above, the monitor is able to use the above equation and values to set a threshold in the monitor and to determine if the attitude error sensitivity is better than some minimum level.

Figure 5:
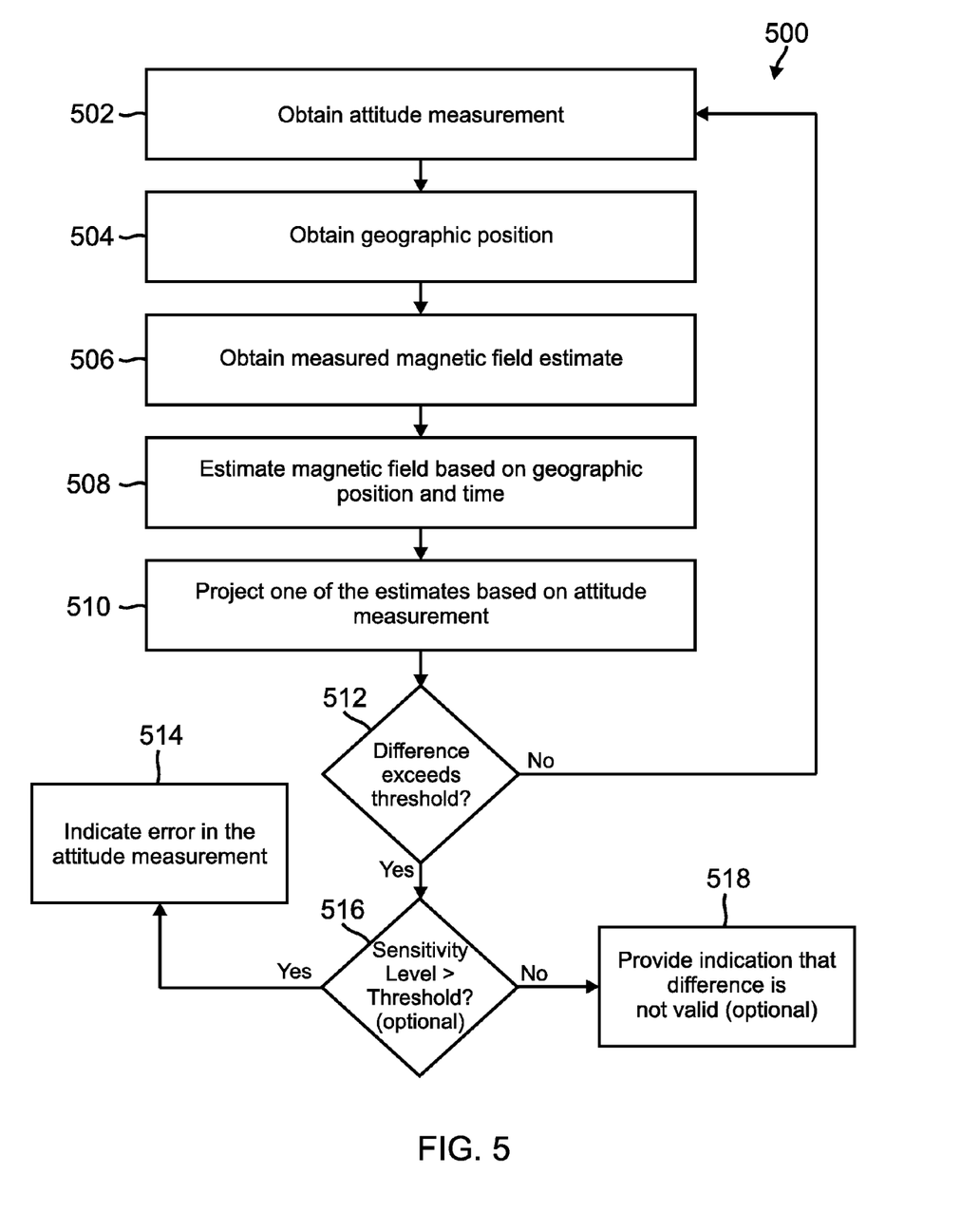
FIG. 5 is a flow chart depicting one embodiment of an exemplary method of monitoring for attitude faults.

FIG. 5 is a flow chart depicting one embodiment of an exemplary method 500 of monitoring for attitude faults. It is to be understood that although method 500 is discussed in a serial fashion, individual acts can be performed in different order or in parallel with other acts.

At block 502, an attitude solution is obtained from an attitude reference system (also referred to herein as an attitude source), as discussed above. At block 504, a geographic position is obtained, as discussed above. For example, the geographic position can be determined based on position measurements from a position sensor or based on position estimates from the attitude source. At block 506, a magnetic field measurement (also referred to as a measured magnetic field estimate) is obtained, such as with a magnetometer discussed above. At block 508, a magnetic field estimate from an Earth Magnetic Field Model (also referred to as an EMFM estimate) is computed based on geographic position and time. For example, the geographic position and time at which the position measurement was obtained can be used as an index to the Earth Magnetic Field Model.

At block 510, at least one of the magnetic field estimates is projected or transformed based on the attitude solution such that the magnetic field estimates are in a common shared frame. For example, one of the magnetic field estimates can be transformed into the frame of the other based on the attitude solution. In particular, either the measured magnetic field estimate is projected into a reference frame of the EMFM estimate based on the obtained attitude solution or the EMFM estimate is projected into the frame of the measured magnetic field estimate based on the obtained attitude solution, as discussed above. In other embodiments, the common shared frame is neither the frame of the measured magnetic field estimate nor the frame of the EMFM estimate and both magnetic field estimates are transformed into the common shared frame.

At block 512, it is determined if a difference between the measured magnetic field and the EMFM estimate in the common shared frame exceeds a predetermined threshold. For example, if the measured magnetic field estimate was projected into the frame of the EMFM estimate, then a difference between the projected measured magnetic field and the EMFM estimate is compared to the threshold. Similarly, if the EMFM estimate was projected into the frame of the measured magnetic field estimate, then a difference between the projected EMFM estimate and the measured magnetic field estimate is compared to the threshold. If the difference does not exceed the predetermined threshold, method 500 returns to block 502 to analyze subsequent estimates. If the difference does exceed the predetermined threshold, an alert or warning is output to a display unit, at block 514, indicating that the attitude solution is in error.

At block 516, it is optionally determined if the attitude error sensitivity level is greater than the predetermined threshold, as discussed above. If the attitude error sensitivity level is less than the predetermined threshold, then an indication that the difference between the measurement magnetic field estimate and the Earth Magnetic Field Model estimate is not valid for determining whether the attitude solution is in error at block 518. In some such embodiments, the alert in block 514 is not output if the difference is not valid for determining whether the attitude solution is in error. In embodiments in which blocks 516 and 518 are omitted, the alert is output at block 514 based on the decision at block 512, as described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes an avionics system comprising: one or more attitude sources, each configured to produce a respective calculated attitude solution; at least one magnetometer configured to measure magnetic field in a frame of the avionics system; and at least one attitude monitor configured to use the respective calculated attitude solution from at least one of the one or more attitude sources to project at least one of the measured magnetic field estimate or an Earth Magnetic Field Model estimate such that the measured magnetic field estimate and the Earth Magnetic Field Model estimate are in a common shared frame; wherein the at least one attitude monitor is further configured to determine a respective difference between the measured magnetic field estimate and the Earth Magnetic Field Model estimate in the common shared frame; wherein the at least one attitude monitor is further configured to output an alert, which indicates that the respective calculated attitude solution used to project at least one of the measured magnetic field estimate or the Earth Magnetic Field Model estimate is in error, if the respective difference between the measured magnetic field estimate and the Earth Magnetic Field Model estimate exceeds a predetermined threshold.

Example 2 includes the avionics system of Example 1, wherein the at least one attitude monitor is further configured to determine if an attitude sensitivity level of the at least one monitor exceeds the predetermined threshold; and wherein the at least one attitude monitor is configured to provide an indication that that difference between the measurement magnetic field estimate and the Earth Magnetic Field Model estimate is not valid if the attitude sensitivity level is less than the predetermined threshold.

Example 3 includes the avionics system of claim 2, wherein the one or more attitude sources comprises a plurality of attitude sources, each of the plurality of attitude sources configured to provide a respective measured magnetic field estimate; wherein the at least one attitude monitor is further configured to determine if a difference between the Earth Magnetic Field Model estimate and the respective measured magnetic field estimate of one of the plurality of attitude sources exceeds the predetermined threshold more than a respective difference between the Earth Magnetic Field Model estimate and the respective measured magnetic field estimate of the other attitude sources; and wherein the at least one attitude monitor is configured to indicate that the attitude source, for which the difference exceeds the predetermined threshold more than the respective differences for the other attitude sources, is faulted.

Example 4 includes the avionics system of any of Examples 1-3, wherein the one or more attitude sources comprises a plurality of attitude sources; and wherein the at least one monitor comprises a plurality of monitors, each of the plurality of monitors corresponding to a respective one of the plurality of attitude sources.

Example 5 includes the avionics system of Example 4, wherein each of the plurality of attitude monitors is integral to a respective one of the plurality of attitude sources.

Example 6 includes the avionics system of any of Examples 1-4, further comprising a position sensor configured to provide position data to the at least one attitude monitor, the at least one attitude monitor configured to determine the Earth Magnetic Field Model estimate based, at least in part, on the position data.

Example 7 includes the avionics system of Example 6, wherein the position sensor is one of a Global Navigation Satellite System receiver and an Inertial Reference System.

Example 8 includes the avionics system of any of Examples 1-7, wherein each of the one or more attitude sources comprises one of an Air Data Inertial Reference Unit (ADIRU), an Inertial Reference Unit (IRU), or an Attitude Heading Reference Unit (AHRU)

Example 9 includes the avionics system of any of Examples 1-8, wherein at least one of the one or more attitude sources is configured to provide position data to the at least one attitude monitor, the at least one attitude monitor configured to determine the Earth Magnetic Field Model estimate based, at least in part, on the position data.

Example 10 includes the avionics system of any of Examples 1-9, wherein the common shared frame is one of the frame of the avionics system or the reference frame of the Earth Magnetic Field Model estimate.

Example 11 includes a method of monitoring attitude faults in an avionics system, the method comprising: obtaining an attitude solution; obtaining a geographic position of the avionics system; obtaining a measured magnetic field estimate in a frame of the avionics system; computing an Earth Magnetic Field Model (EMFM) estimate in a reference frame based, at least in part, on the geographic position of the avionics system; transforming at least one of the measured magnetic field estimate or the EMFM estimate based on the attitude solution such that the measured magnetic field estimate and the EMFM estimate are in a common shared frame; determining if a difference between the measured magnetic field estimate and the EMFM estimate in the common shared frame exceeds a predetermined threshold; if the difference exceeds the predetermined threshold, outputting an alert indicating that the attitude solution is in error.

Example 12 includes the method of Example 11, wherein obtaining the geographic position comprises obtaining the geographic position from one of a position sensor or an attitude source which generates the attitude solution.

Example 13 includes the method of Example 12, wherein obtaining the geographic position from a position sensor comprises obtaining the geographic position from a Global Navigation Satellite System receiver.

Example 14 includes the method of any of Examples 11-13, wherein the common shared frame is one of the frame of the avionics system or the reference frame of the EMFM estimate.

Example 15 includes the method of any of Examples 11-14, further comprising: determining if an attitude error sensitivity level is greater than the predetermined threshold; and providing an indication that the difference between the measurement magnetic field estimate and the Earth Magnetic Field Model estimate is not valid if the attitude error sensitivity level is less than the predetermined threshold.

Example 16 includes a program product comprising a processor-readable medium on which program instructions are embodied, wherein the program instructions are configured, when executed by at least one programmable processor, to cause the at least one programmable processor to: receive a measured magnetic field estimate in a frame of an avionics system; compute an Earth Magnetic Field Model (EMFM) estimate in a reference frame based, at least in part, on a geographic position of the avionics system; transform at least one of the received measured magnetic field estimate or the EMFM estimate based on an attitude solution received from an attitude source such that the measured magnetic field estimate and the EMFM estimate are in a common shared frame; determine if a difference between the measured magnetic field estimate and the EMFM estimate in the common shared frame exceeds a predetermined threshold; and output an alert indicating that the attitude solution is in error if the difference exceeds the predetermined threshold.

Example 17 includes the program product of Example 16, wherein the program instructions are further configured to cause the at least one programmable processor to obtain the geographic position from a position sensor.

Example 18 includes the program product of any of Examples 16-17, wherein the common shared frame is one of the frame of the avionics system or the reference frame of the EMFM estimate; and wherein the program instructions are further configured to cause the at least one programmable processor to transform the measured magnetic field estimate to the reference frame of the EMFM estimate or to transform the EMFM estimate to the frame of the avionics system.

Example 19 includes the program product of any of Examples 16-18, wherein the program instructions are further configured to cause the at least one programmable processor to determine if an attitude sensitivity level exceeds the predetermined threshold.

Example 20 includes the program product of any of Examples 16-19, wherein the program instructions are further configured to cause the at least one programmable processor to determine if an attitude error sensitivity level is greater than the predetermined threshold; and output an indication that that difference between the measurement magnetic field estimate and the Earth Magnetic Field Model estimate is not valid for determining whether the attitude solution is in error if the attitude error sensitivity level is less than the predetermined threshold.

What is claimed is:

1. An avionics system comprising:
   one or more attitude sources, each configured to produce a respective calculated attitude solution;
   at least one magnetometer configured to measure magnetic field in a frame of the avionics system and provide the measurement as a measured magnetic field estimate; and
   at least one attitude monitor configured to use the respective calculated attitude solution from at least one of the one or more attitude sources to project at least one of the measured magnetic field estimate or an Earth Magnetic Field Model estimate such that the measured magnetic field estimate and the Earth Magnetic Field Model estimate are in a common shared frame;
   wherein the at least one attitude monitor is further configured to determine a respective difference between the measured magnetic field estimate and the Earth Magnetic Field Model estimate in the common shared frame;
   wherein the at least one attitude monitor is further configured to output an alert, which indicates that the respective calculated attitude solution used to project at least one of the measured magnetic field estimate or the Earth Magnetic Field Model estimate is in error, when the respective difference between the measured magnetic field estimate and the Earth Magnetic Field Model estimate exceeds a predetermined threshold; and
   wherein the at least one attitude monitor is configured to provide an indication that the difference between the measurement magnetic field estimate and the Earth Magnetic Field Model estimate is not valid when an attitude sensitivity level of the at least one attitude monitor is less than the predetermined threshold.

2. The avionic system of claim 1, wherein the at least one attitude monitor is further configured to determine when the attitude sensitivity level of the at least one attitude monitor exceeds the predetermined threshold.

3. The avionics system of claim 2, wherein the one or more attitude sources comprises a plurality of attitude sources, each of the plurality of attitude sources configured to provide a respective measured magnetic field estimate;
   wherein the at least one attitude monitor is further configured to determine when a difference between the Earth Magnetic Field Model estimate and the respective measured magnetic field estimate of one of the plurality of attitude sources exceeds the predetermined threshold more than a respective difference between the Earth Magnetic Field Model estimate and the respective measured magnetic field estimate of the other attitude sources;
   wherein the at least one attitude monitor is configured to indicate that the attitude source, for which the difference exceeds the predetermined threshold more than the respective differences for the other attitude sources, is faulted.

4. The avionics system of claim 1, wherein the one or more attitude sources comprises a plurality of attitude sources; and
   wherein the at least one monitor comprises a plurality of monitors, each of the plurality of monitors corresponding to a respective one of the plurality of attitude sources.

5. The avionics system of claim 4, wherein each of the plurality of attitude monitors is integral to a respective one of the plurality of attitude sources.

6. The avionics system of claim 1, further comprising a position sensor configured to provide position data to the at least one attitude monitor, the at least one attitude monitor configured to determine the Earth Magnetic Field Model estimate based, at least in part, on the position data.

7. The avionics system of claim 6, wherein the position sensor is one of a Global Navigation Satellite System receiver or an Inertial Reference System.

8. The avionics system of claim 1, wherein each of the one or more attitude sources comprises one of an Air Data Inertial Reference Unit (ADIRU), an Inertial Reference Unit (IRU), or an Attitude Heading Reference Unit (AHRU).

9. The avionics system of claim 1, wherein at least one of the one or more attitude sources is configured to provide position data to the at least one attitude monitor, the at least one attitude monitor configured to determine the Earth Magnetic Field Model estimate based, at least in part, on the position data.

10. The avionics system of claim 1, wherein the common shared frame is one of the frame of the avionics system or the reference frame of the Earth Magnetic Field Model estimate.

11. A method of monitoring attitude faults in an avionics system, the method comprising:
    obtaining an attitude solution;
    obtaining a geographic position of the avionics system;
    obtaining a measured magnetic field estimate in a frame of the avionics system;
    computing an Earth Magnetic Field Model (EMFM) estimate in a reference frame based, at least in part, on the geographic position of the avionics system;
    transforming at least one of the measured magnetic field estimate or the EMFM estimate based on the attitude solution such that the measured magnetic field estimate and the EMFM estimate are in a common shared frame;

determining when a difference between the measured magnetic field estimate and the EMFM estimate in the common shared frame exceeds a predetermined threshold;

when the difference exceeds the predetermined threshold, outputting an alert indicating that the attitude solution is in error; and providing an indication that the difference between the measurement magnetic field estimate and the Earth Magnetic Field Model estimate is not valid when an attitude error sensitivity level is less than the predetermined threshold.

12. The method of claim 11, wherein obtaining the geographic position comprises obtaining the geographic position from one of a position sensor or an attitude source which generates the attitude solution.

13. The method of claim 12, wherein obtaining the geographic position from a position sensor comprises obtaining the geographic position from a Global Navigation Satellite System receiver.

14. The method of claim 11, wherein the common shared frame is one of the frame of the avionics system or the reference frame of the EMFM estimate.

15. The method co claim 11, further comprising:
determining when the attitude error sensitivity level is greater than the predetermined threshold.

16. A program product comprising a non-transitory processor-readable medium on which program instructions are embodied, wherein the program instructions are configured, when executed by at least one programmable processor, to cause the at least one programmable processor to:

receive a measured magnetic field estimate in a frame of an avionics system;

compute an Earth Magnetic Field Model (EMFM) estimate in a reference frame based, at least in part, on a geographic position of the avionics system;

transform at least one of the received measured magnetic field estimate or the EMFM estimate based on an attitude solution received from an attitude source such that the measured magnetic field estimate and the EMFM estimate are in a common shared frame;

determine when a difference between the measured magnetic field estimate and the EMFM estimate in the common shared frame exceeds a predetermined threshold;

output an alert indicating that the attitude solution is in error when the difference exceeds the predetermined threshold; and output an indication that the difference between the measurement magnetic field estimate and the Earth Magnetic Field Model estimate is not valid for determining whether the attitude solution is in error when an attitude error sensitivity level is less than the predetermined threshold.

17. The program product of claim 16, wherein the program instructions are further configured to cause the at least one programmable processor to obtain the geographic position from a position sensor.

18. The program product of claim 16, wherein the common shared frame is one of the frame of the avionics system or the reference frame of the EMFM estimate; and wherein the program instructions are further configured to cause the at least one programmable processor to transform the measured magnetic field estimate to the reference frame of the EMFM estimate or to transform the EMFM estimate to the frame of the avionics system.

19. The program product of claim 16, wherein the program instructions are further configured to cause the at least one programmable processor to determine when an attitude sensitivity level exceeds the predetermined threshold.

20. The program product of claim 16, wherein the program instructions are further configured to cause the at least one programmable processor to:
determine when the attitude error sensitivity level is greater than the predetermined threshold.

* * * * *